United States Patent
Rivera et al.

(10) Patent No.: US 9,566,939 B1
(45) Date of Patent: Feb. 14, 2017

(54) SHEAR PIN FAILURE SYSTEM

(71) Applicant: Google Inc., Mountain View, CA (US)

(72) Inventors: Felix Jose Alvarez Rivera, Tarzana, CA (US); Atul Gupta, San Jose, CA (US); Thomas Daniel, San Francisco, CA (US); Daniel Lynn Larner, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/845,702

(22) Filed: Sep. 4, 2015

(51) Int. Cl.
*B60R 21/34* (2011.01)
*B60R 21/0134* (2006.01)
*B60R 21/01* (2006.01)

(52) U.S. Cl.
CPC .......... *B60R 21/34* (2013.01); *B60R 21/0134* (2013.01); *B60R 2021/01013* (2013.01); *B60R 2021/01286* (2013.01)

(58) Field of Classification Search
CPC ................. B60R 21/34; B60R 21/0134; B60R 2021/01286; B60R 2021/01013
USPC ......................................................... 701/45
See application file for complete search history.

(56) References Cited

U.S. PATENT DOCUMENTS

| 7,946,376 B2 | 5/2011 | Hayashi et al. | |
| 9,205,794 B1* | 12/2015 | Farooq | B60R 19/18 |
| 2005/0212327 A1* | 9/2005 | Schramm | B60R 21/34 |
| | | | 296/187.04 |

FOREIGN PATENT DOCUMENTS

| EP | 2607179 B1 | 11/2014 |
| JP | 2004026027 A * | 1/2004 |
| WO | 2004113131 A1 | 12/2004 |

* cited by examiner

*Primary Examiner* — Brian P Sweeney
(74) *Attorney, Agent, or Firm* — Lerner, David, Littenberg, Krumholz & Mentlik, LLP

(57) ABSTRACT

Aspects of the disclosure relate to adjusting a shear pin to minimize an impact force felt by an object in a collision with a vehicle. For example, one or more second computing devices may receive, from one or more first computing devices, information indicating that an impact with an object is imminent. In response to the received information, the second computing devices may determine a first shear force for a first shear pin, wherein the first shear force is a desired amount of shear force necessary to break the first shear pin. The second computing devices may send a triggering signal to activate an actuator prior to an impact with the identified impact target. The actuator, in response to receiving the triggering signal, may adjust the first shear pin in a first pinhole, so the first shear pin will break at the first shear force.

20 Claims, 10 Drawing Sheets

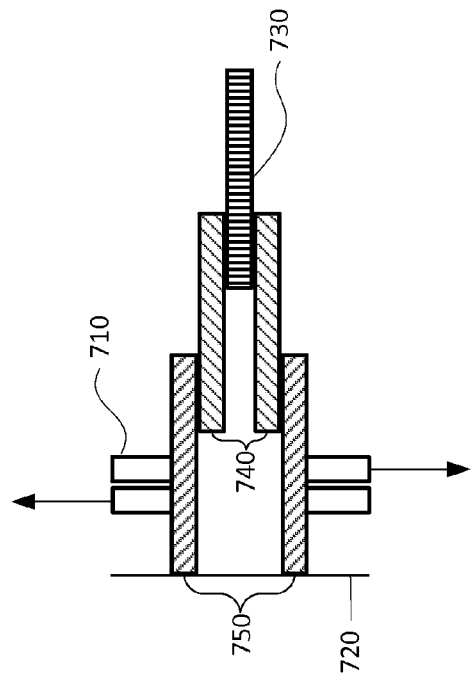
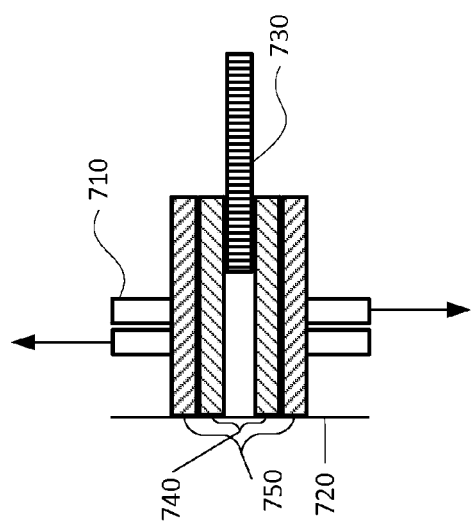
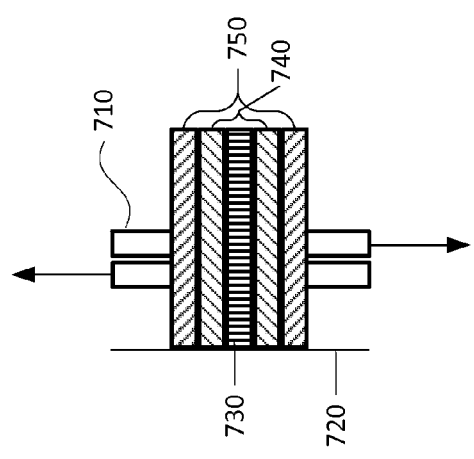
Figure 7C
Figure 7B
Figure 7A

SHEAR PIN FAILURE SYSTEM

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and the vehicle maneuvers itself to that location.

An important component of an autonomous vehicle is the perception system, which allows the vehicle to perceive and interpret its surroundings using cameras, radar, sensors, and other similar devices. Data from the perception system is then used by the autonomous vehicle's computer to make numerous decisions while the autonomous vehicle is in motion, such as decided when to speed up, slow down, stop, turn, etc. These decisions are used to maneuver between locations but also to interact with and avoid collisions with other objects along the way.

SUMMARY

Embodiments within the disclosure relate generally to a shear pin failure system. One aspect includes a method for adjusting a shear pin to minimize an impact force felt by an object in a collision with a vehicle. Information indicating that an impact with an object is imminent may be received from one or more first computing devices having one or more processors by one or more second computing devices having one or more processors. The one or more second computing devices may determine in response to the received information a first shear force for a first shear pin, wherein the first shear force is a desired amount of shear force necessary to break the first shear pin. The one or more second computing devices may send a triggering signal to activate an actuator prior to an impact with the identified impact target. The actuator may adjust in response to receiving the triggering signal, the first shear pin in a first pinhole, so the first shear pin will break at the first shear force.

Another aspect includes an actuator and one or more computing devices having one or more processors. The one or more second computing devices may be programmed to receive information indicating that an impact with an object is imminent and in response to the received information, determine a first shear force for a first shear pin, wherein the first shear force is a desired amount of shear force necessary to break the first shear pin. The one or more second computing devices may send a triggering signal to activate an actuator to adjust the first shear pin in a first pinhole, so the first shear pin will break at the first shear force, prior to an impact with the identified impact target.

Another aspect includes a non-transitory computer-readable storage medium on which computer-readable instructions of a program are stored. The instructions, when executed by a processor, may cause the processor to perform a method. The method may include receiving, from one or more first computing devices, information indicating that an impact with an object is imminent. In response to the received information, a first shear force for a first shear pin may be determined, wherein the first shear force is a desired amount of shear force necessary to break the first shear pin. A triggering signal may then be sent to activate an actuator prior to an impact with the identified impact target, wherein the actuator, in response to receiving the triggering signal, adjusts the first shear pin in a first pinhole, so the first shear pin will break at the first shear force.

BRIEF DESCRIPTION OF THE DRAWINGS

The present technology is illustrated by way of example, and not by way of limitation, in the figures of the accompanying drawings in which like reference numerals refer to similar elements including:

FIGS. 7A-7C are examples of a telescoping shear pin in accordance with aspects of the disclosure.

DETAILED DESCRIPTION

Overview

Figure 1A:
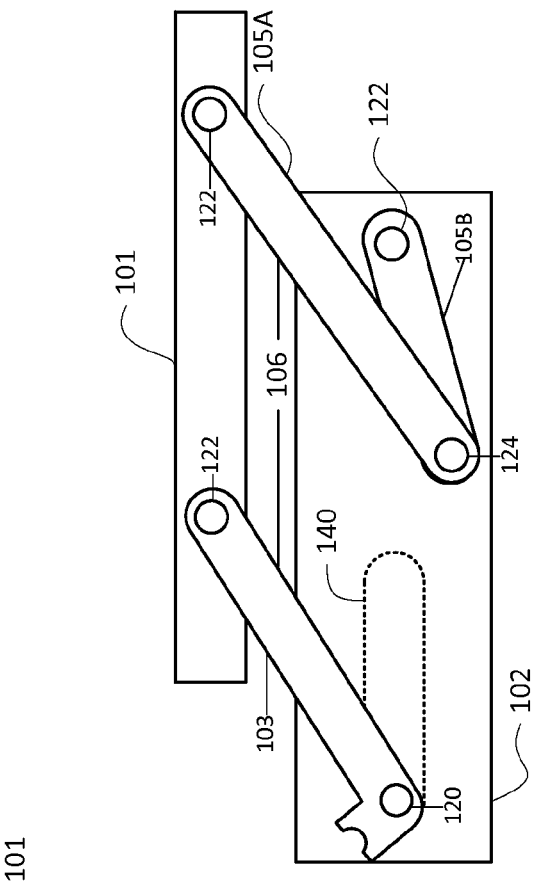
FIGS. 1A and 1B are examples of a panel attached to a vehicle with a hinge in accordance with aspects of the disclosure.

The technology relates to reducing the likelihood of injuries or damage to objects such as pedestrians, bicyclists, animals, other vehicles, or simply inanimate objects caused by collisions with vehicles by adjusting the amount of shear force necessary to break shear pins holding panels of the vehicles in place. For example, computing devices within a vehicle may determine that an impact with an object cannot be avoided by way of braking, steering, and/or accelerating the vehicle. When this is the case, the computing devices may work to adjust the amount of force necessary to break one or more shear pins which are holding a panel of the vehicle in place. Additionally, the computing devices may adjust the distance through which force is applied. By doing so, the force of impact on the object which the vehicle collides may be reduced, thereby limiting the severity of injuries and/or damage to the object.

Panels which comprise the exterior of a vehicle may be mounted to a body of the vehicle by the use of one or more hinges. The hinges may be designed to allow for the hood to be placed into an open or closed position, or a position there between. In some embodiments, the hinges may be used to attach components other than panels of the vehicle, such as engine components, radiators, washer fluid reservoirs, etc.

The hinges may also include one or more hinge pins, which attach the hinges to one or more slotted paths on the vehicle. In this regard, the hinge pins may limit the range of motion the hinges may travel. For example, the hinge pins may attach the hinges to the slotted paths, thereby allowing the hinge to travel along and within the slotted path. The range of motion of the hinges is thereby limited. In some embodiments, the range of motion of the hinges may be limited by the slotted path, so that the hood attached to the hinges may be placed in either an open or closed position.

The range of motion of the hinges may be further limited by the use of the one or more shear pins. In this regard the one or more shear pins may be placed within pinholes in the slotted path on the vehicle. As such, when the hinge pins slide along the slotted path, the hinge pins, or a portion of the hinge, may be made with the shear pins, stopping further movement of the hinges within the slotted path. For example, when the hood of the vehicle is closed, one or more bars comprising the hinges may contact the shear pins. As such, the hinges are prevented from moving past the shear pins. On the occasion that the shear pins break, such as during a collision between the vehicle and an object, the hinges may move freely in the slotted path, such as forward and downward, thereby reducing the impact force on the object.

The pinholes in the slotted path of the vehicle may include one or more shear areas which adjust the amount of shear force necessary to break shear pins. Shear areas may be locations where shear stress is placed on the one or more shear pins. In this regard, the pinholes may include a shingle-shear area, double-shear area, triple-shear area, or more shear areas. The amount of shear force necessary to break a shear pin is doubled for each additional shear area included in a pinhole. For example, a double-shear area pinhole may require twice as much shear force to break a shear pin, than a single-shear area pinhole.

One or more shear pins may be designed to break upon the application of a predetermined amount of shear force. In addition to the number of shear areas in a pinhole, each of the one or more shear pins may be designed such that the amount of shear force necessary to break the one or more shear pins may be adjusted. For example, the one or more shear pins can be tapered shear pins. The tapered shear pins may be formed so that they increase in size (width) from a first end to a second end. As such, the strength of the shear pin increases from the first end to the second end. Depending on the depth that the tapered shear pin is placed into a pinhole, the more shear force is required to break the tapered shear pin.

The one or more shear pins may be positioned in line in the slotted path to create a staged shearing support. In this regard, the one or more shear pins may be inserted into pinholes positioned along the slotted path. Each pin of the one or more shear pins may break upon the application of the same or a different amount of shear force. For example, in a one pin shear pin design, the application of a first amount of shear force may cause a first shear pin to break, allowing the hinge to move further along the slotted path. In a two shear pin design, the application of a first amount of shear force may cause a first shear pin to break, allowing the hinge move along the slotted path into a second shear pin. The second shear pin may require a second amount of shear force, greater than the first amount of shear force, to break. Therefore the second shear pin positioned behind the first shear pin may stop the hinge from moving further along the slotted path.

Figure 4:
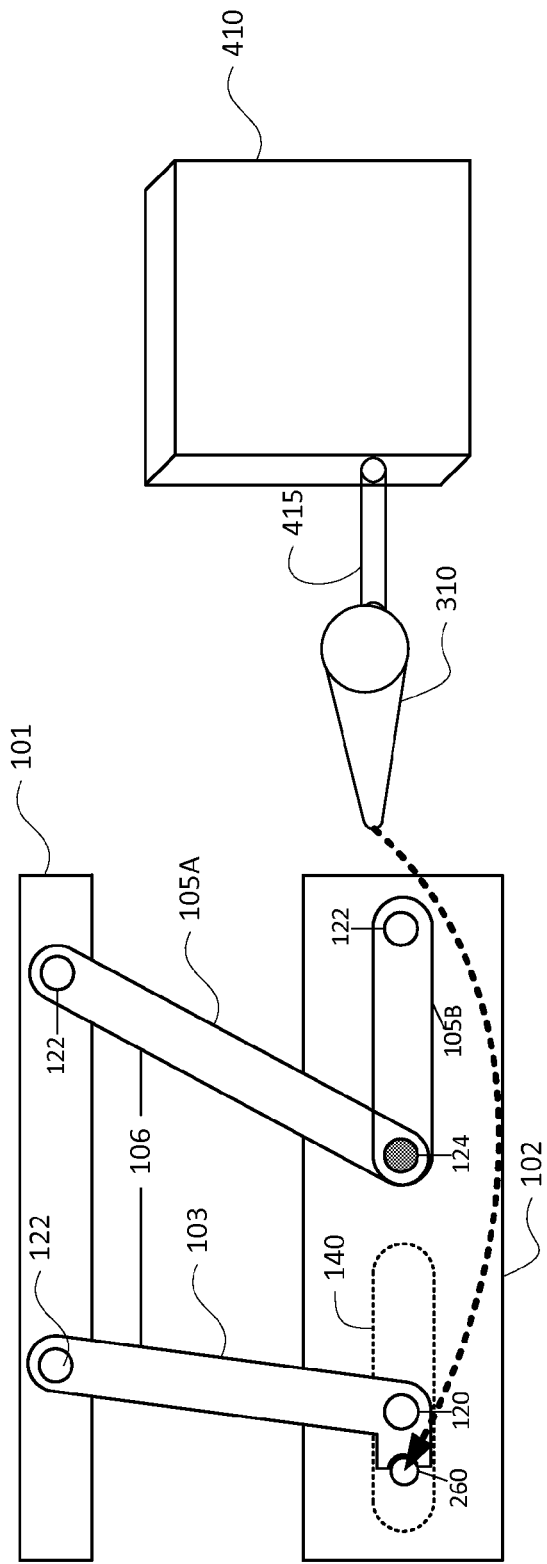
FIG. 4 is an example of an actuator adjusted shear pin system in accordance with aspects of the disclosure.

The positioning of a shear pin within a pinhole may be controlled by an actuator, such as a solenoid. In this regard, a solenoid may adjust the placement and/or orientation of the one or more shear pins in the pinholes, as shown in FIG. 4. For example, a tapered shear pin may be inserted so that a portion of the taper shear pin closer to the first end is within the pinhole which includes a single shear area. In another example, the solenoid may position the back end of the tapered shear pin within the pinhole with a double shear area.

Computing devices within the vehicle may determine that an impact with an object cannot be avoided by way of braking, steering, and/or accelerating the vehicle. In this regard, the vehicle may have a highly sophisticated perception system including a plurality of sensors. Data from the sensors may be received and processed by one or more computing devices of the vehicle's perception and/or control systems in real time in order to detect and identify the characteristics (size, speed, shape, direction, object type, etc.) of objects in the vehicle's environment.

The characteristics of the object with which impact is imminent may be used to determine to adjust the amount of shear force necessary to break the one or more shear pins, in an effort to minimize the impact force felt by the object. In this regard, the size of an object may be used to estimate its mass. This in turn, may be used to determine the appropriate amount of shear force for the shear pins.

A shear pin control system may be used to adjust the amount of shear force necessary to break the one or more shear pins to minimize the force of impact to the objects outside of the vehicle. For example, the shear pin control system may be activated or deployed by a signal generated by one or more computing devices of the vehicle when an impact with an object is imminent. The shear pin control system may, in response to the signal, cause a solenoid to adjust the amount of shear force necessary to break the one or more shear pins to assist in reducing the impact force felt by the object.

In some embodiments different positioning and types of shear pins may be used. For example telescoping pins or varying material shear pins may be used in place of, or in conjunction with, tapering shear pins. Additionally, the panels of the vehicle may be attached to the vehicle via a vertical shear. As such, hinges may be unnecessary.

Example Systems

Panels which comprise the exterior of a vehicle may be mounted to a body of the vehicle by the use of one or more hinges. In one instance, these hinges may be designed to allow for a hood at a front end of the vehicle to be placed into an open position, closed position, collapsed position, or a position there between. For example, as shown in FIG. 1A, a hood 101 in a closed position may be attached to the body of a vehicle 102 by the use of hinges 106. The hinges 106 may be comprised of multiple hinge bars including hinge bars 103, 105A, and 105B. The hinges 106 may be attached to the hood 101 and body of the vehicle 102 using bolts 122. The hinges 106 may be comprised of one or more hinge bars, such as hinge bars 105A and 105B, attached together by one or more connector bolts, such as connector bolt 124. Connector bolt 124 and bolts 122, may allow for the hinges to rotate around the attachment points.

Although this example relates to a hood, the features described herein may also be used in conjunction with hinged panels located at other areas of the vehicle. For instance, the hinges may be used to attach components other than panels of the vehicle, such as engine components, radiators, washer fluid reservoirs, etc.

The hinges may also include one or more hinge pins, which attach the hinges to one or more slotted paths on the vehicle. In this regard, the hinge pins may limit the range of motion the hinges may travel. For example, as shown in FIG. 1A, the hinge pin 120 may attach hinge bar 103 to the slotted path 140, thereby allowing hinge bar 103 to travel along and within the slotted path 140. The range of motion of the hinges 106 is thereby limited. In some embodiments, the range of motion of the hinges may be limited by the slotted path, so that the hood attached to the hinges may be placed in either an open or closed position.

The range of motion of the hinges may be further limited by the use of the one or more shear pins. In this regard the one or more shear pins may be placed within pinholes in the slotted path on the vehicle. As such, when the hinge pins slide along the slotted path, the hinge pins, or a portion of the hinge, may be made with the shear pins, stopping further movement of the hinges within the slotted path. For example, as shown in FIG. 1A, when the hood 101 of the vehicle is closed, hinge bar 103 may contact the shear pin 130. As such, the hinges 106 are prevented from moving past the shear pin 130 in the slotted path 140.

Figure 1B:
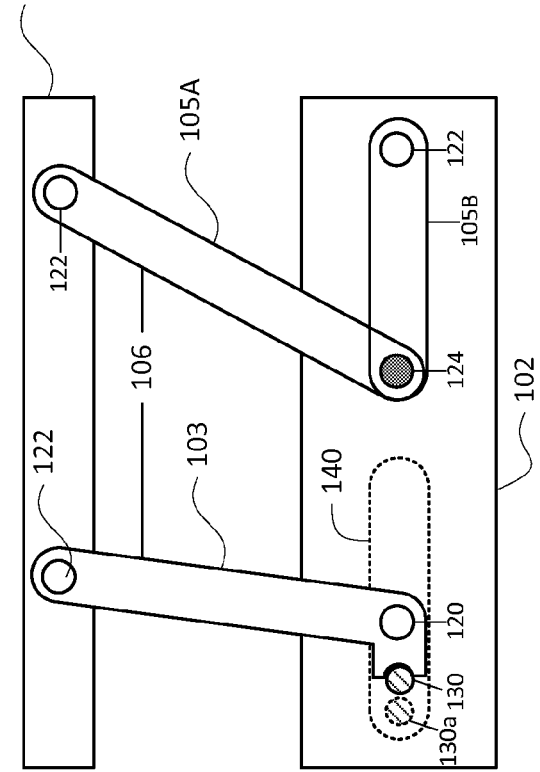

One or more shear pins may be designed to break upon the application of a predetermined amount of shear force. On the occasion that the shear pins break, such as during a collision between the vehicle and an object, the hinges may move freely in the slotted path, such as forward and downward, thereby reducing the impact force on the object. For example, as shown in FIG. 1B, shear pin 130 may be broken and hinge bar 103 may continue unimpeded along slotted path 140. As such, the hinge 106 may collapse downward and forward, pushing the hood 101 downward and forward a corresponding amount.

The pinholes in the slotted path of the vehicle may include one or more shear areas which adjust the amount of shear force necessary to break shear pins. Shear areas may be locations where shear stress is placed on the one or more shear pins. For example, as shown in FIGS. 2A-2C the pinholes may be designed as single-shear area pinholes, double-shear area pinholes, triple-shear area pinholes, respectively, or more shear area pinholes.

Figures 2A, 2B, 2C:
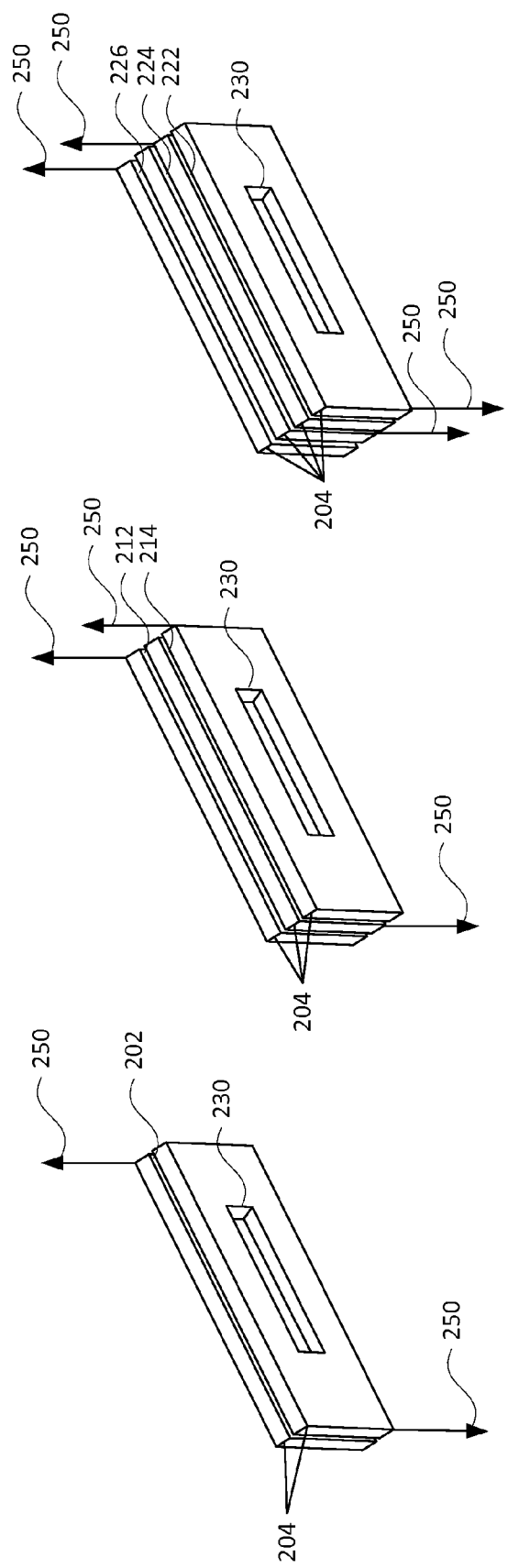
FIGS. 2A-2C are examples of pinholes including one or more shear areas in accordance with aspects of the disclosure.

The single-shear area pinhole, as shown in FIG. 2A, may be formed by placing two plates 204 next to each other. The plates may be made of a material commonly used to attach panels to vehicles, such as steel, aluminum, etc. Each plate 204 may include a pinhole 230 through which a shear pin may be inserted. When a shearing stress is introduced by the two plates through the application of opposite forces, represented by the arrows 250, a shear force is applied to the shear pin in the shear area 202, located between the two plates 204.

Double-shear area pinholes 210, triple-shear area pinholes 220 may be formed by placing three and four plates 204 next to each other, respectively. Each plate 204 may include a pinhole 230 through which a shear pin may be inserted. When a shearing stress is introduced by the plates through the application of opposite forces, represented by the arrows, a shear force is applied to the shear pin in the shear areas. In this regard, a shear force may be applied to the shear pin in shear areas 212 and 214 of the double-shear area pinhole 210. Similarly, a shear force may be applied to the shear pin in shear areas 222, 224, and 226 of the triple-shear area pinhole 220.

The amount of shear force necessary to break a shear pin is doubled for each additional shear area included in a pinhole. For example, a double-shear area pinhole may require twice as much shear force to break a shear pin, than a single-shear area pinhole. Likewise, a four-shear area pinhole may require twice as much shear force to break a shear pin, than a double-shear area pinhole.

Figure 3B:
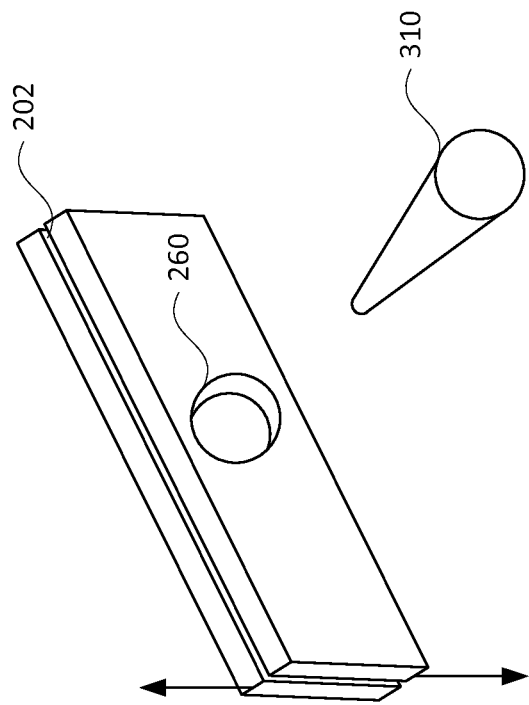
FIGS. 3A and 3B are examples of pinholes and tapered shear pins in accordance with aspects of the disclosure.
Figure 3A:
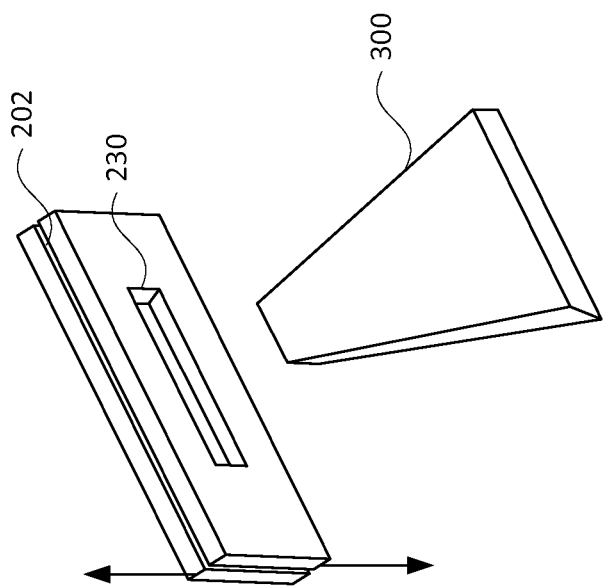

In addition to the number of shear areas in a pinhole, each of the one or more shear pins may be designed such that the amount of shear force necessary to break the one or more shear pins may be adjusted. For example, as shown in FIGS. 3A and 3B, the one or more shear pins can be tapered shear pins. The tapered shear pins 300 and 310 may be formed so that they increase in size (width) from a first end to a second end. As such, the strength of the shear pins 300 and 310 increase from the first end to the second end.

Depending on the depth at which a tapered shear pin is placed into a pinhole, the more shear force is required to break the tapered shear pin. For example, as shown in FIG. 3A, shear pin 300, having a trapezoidal pyramid shape, may be inserted into a pinhole 230 shaped to fit the entire trapezoidal pyramid shear pin 300. Depending on the depth the trapezoidal pyramid shear pin 300 is inserted into the pinhole 230, the amount of shear force at the shear area 202 necessary to break the trapezoidal pyramid shear pin 300 may be adjusted.

Similarly, as shown in FIG. 3B, a shear pin 310, having a conical shape, may be inserted into a round pinhole 260 shaped to fit the entire conical shear pin 310. Depending on the depth the conical shear pin 310 is inserted into the round pinhole 260, the amount of shear force at the shear area 202 necessary to break the conical shear pin 300 may be adjusted.

In some embodiments, a shear pin 130 may be inserted partially into a multiple shear area pin hole. As such, the shear pin 130 may only encounter shear forces from the shear areas which the shear pin is positioned 130. For example, a shear pin 130 may be partially positioned in a triple-shear area pin hole, such as triple-shear area pinhole 220 of FIG. 2. As an example, if a shear pin is placed through only three of the four plates 204, shear pin 130 may only be subjected to two of the three shear forces, for instance at shear areas 222 and 224 and not at shear area 2226, of the triple-shear area pinhole 220.

The one or more shear pins may be positioned in line in the slotted path to create a staged shearing support. In this regard, the one or more shear pins may be inserted into pinholes positioned along the slotted path. Each pin of the one or more shear pins may break upon the application of the same or a different amount of shear force. For example, in a one pin shear pin design, the application of a first amount of shear force may cause a first shear pin to break, allowing the hinge to move further along the slotted path. In a two shear pin design, the application of a first amount of shear force may cause a first shear pin to break, allowing the hinge move along the slotted path towards a second shear pin. The second shear pin may require a second amount of shear force, greater than the first amount of shear force, to break. Therefore the second shear pin positioned behind the first shear pin may stop the hinge from moving further along the slotted path. If the second shear pin is also broken, the hinge may continue to move along the slotted path passed the location of the second shear pin.

Referring back to FIG. 1A, the one or more shear pins 130 and 130a may be placed inline in the slotted path 140. In this regard, the shear pins 130 and 130a may be placed inline. Hinge bar 103 may initially contact the shear pin 130, and on the occasion shear pin 130 breaks, hinge bar 103 may make contact with shear pin 130a. As such, only a partial collapse of the hood 101 may occur before hinge bar 103 makes contact with shear pin 130a, stopping further collapse of the hood 101 (not shown). As shown in FIG. 1B, if shear pin 130a is also broken, the hinge bar 103 may continue to move along the slotted path 140 passed the location of shear pin 130a.

The positioning of a shear pin within a pinhole may be controlled by an actuator, such as a solenoid. In this regard, a solenoid 410, using an adjustment arm 415, may adjust the placement and/or orientation of the one or more shear pins in the pinholes, as shown in FIG. 4. For example, the conical shear pin 310 may be inserted so that a portion of the conical shear pin 310 closer to the first end is within the pinhole 260. In another example, the solenoid 410 may position the back end of the conical shear pin 310. As previously described, pinhole 260 can include any number of shear areas.

Figure 5:
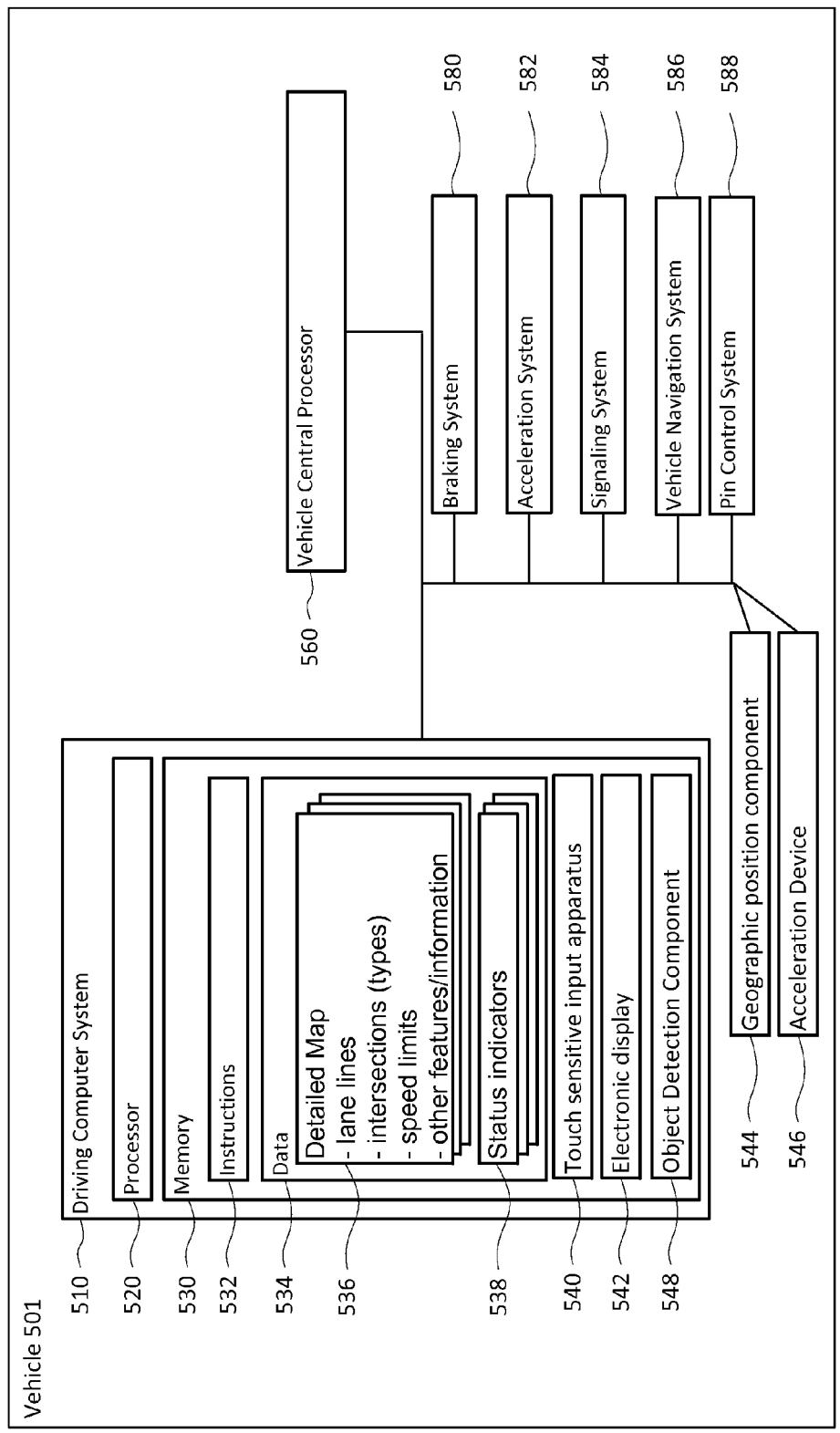
FIG. 5 is a functional diagram of an example computing device in accordance with aspects of the disclosure.

As noted above, the features described herein may be used in conjunction with a vehicle. For instance, as shown in FIG. 5, a driving system 500 in accordance with one aspect of the disclosure includes a vehicle 501 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computers, such as computer 510 containing a processor 520, memory 530 and other components typically present in general purpose computers.

The memory 530 stores information accessible by processor 520, including instructions 532 and data 534 that may be executed or otherwise used by the processor 520. The memory 530 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 532 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 534 may be retrieved, stored or modified by processor 520 in accordance with the instructions 532. For instance, although the claimed subject matter is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 520 may be any conventional processor, such as commercially available CPUs. Alternatively, the processor may be a dedicated device such as an ASIC or other hardware-based processor. Although FIG. 1 functionally illustrates the processor, memory, and other elements of computer 510 as being within the same block, it will be understood by those of ordinary skill in the art that the processor, computer, or memory may actually comprise multiple processors, computers, or memories that may or may not be stored within the same physical housing. For example, memory may be a hard drive or other storage media located in a housing different from that of computer 510. Accordingly, references to a processor or computer will be understood to include references to a collection of processors or computers or memories that may or may not operate in parallel. Rather than using a single processor to perform the steps described herein, some of the components, such as steering components and deceleration components, may each have their own processor that only performs calculations related to the component's specific function.

In various aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 510 may all of the components normally used in connection with a computer such as a central processing unit (CPU), memory (e.g., RAM and internal hard drives) storing data 534 and instructions such as a web browser, an electronic display 542 (e.g., a monitor having a screen, a small LCD touch-screen or any other electrical device that is operable to display information), user input 540 (e.g., a mouse, keyboard, touch screen and/or microphone), as well as various sensors (e.g., a video camera) for gathering explicit (e.g., a gesture) or implicit (e.g., "the person is asleep") information about the states and desires of a person.

In one example, computer 510 may be an autonomous driving computing system incorporated into vehicle 501. The autonomous vehicle may include all of the features of a non-autonomous vehicle.

The driving computing system may capable of communicating with various components of the vehicle. For example, computer 510 may be in communication with the vehicle's central processor 560 and may send and receive information from the various systems of vehicle 501, for example the braking 580, acceleration 582, signaling 584, navigation 586, pin control 588, and systems in order to control the movement, speed, collision management, etc. of vehicle 501. The pin control system 588 may adjust the positioning of a shear pin within a pinhole, by controlling an actuator, such as a solenoid 410. In addition, when engaged, computer 510 may control some or all of these functions of vehicle 501 and thus be fully or merely partially autonomous. It will be understood that although various systems and computer 510 are shown within vehicle 501, these elements may be external to vehicle 501 or physically separated by large distances.

The vehicle may also include a geographic position component 544 in communication with computer 510 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other devices in communication with computer 510, such as an accelerometer, gyroscope or another direction/speed detection device 546 to determine the direction and speed of the vehicle or changes thereto. By way of example only, acceleration device 546 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 510, other computers and combinations of the foregoing.

The computer 510 may control the direction and speed of the vehicle by controlling various components. By way of example, if the vehicle is operating in a completely autonomous mode, computer 510 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

The vehicle may also include an object detection component 548, for detecting objects external to the vehicle such as other vehicles, obstacles in the roadway, traffic signals, signs, trees, pedestrians, etc. The detection system may include lasers, sonar, radar, cameras or any other detection devices which record data which may be processed by computer 510. For example, if the vehicle is a small passenger vehicle, the car may include a laser mounted on the roof or other convenient location.

Example Methods

Figure 6:
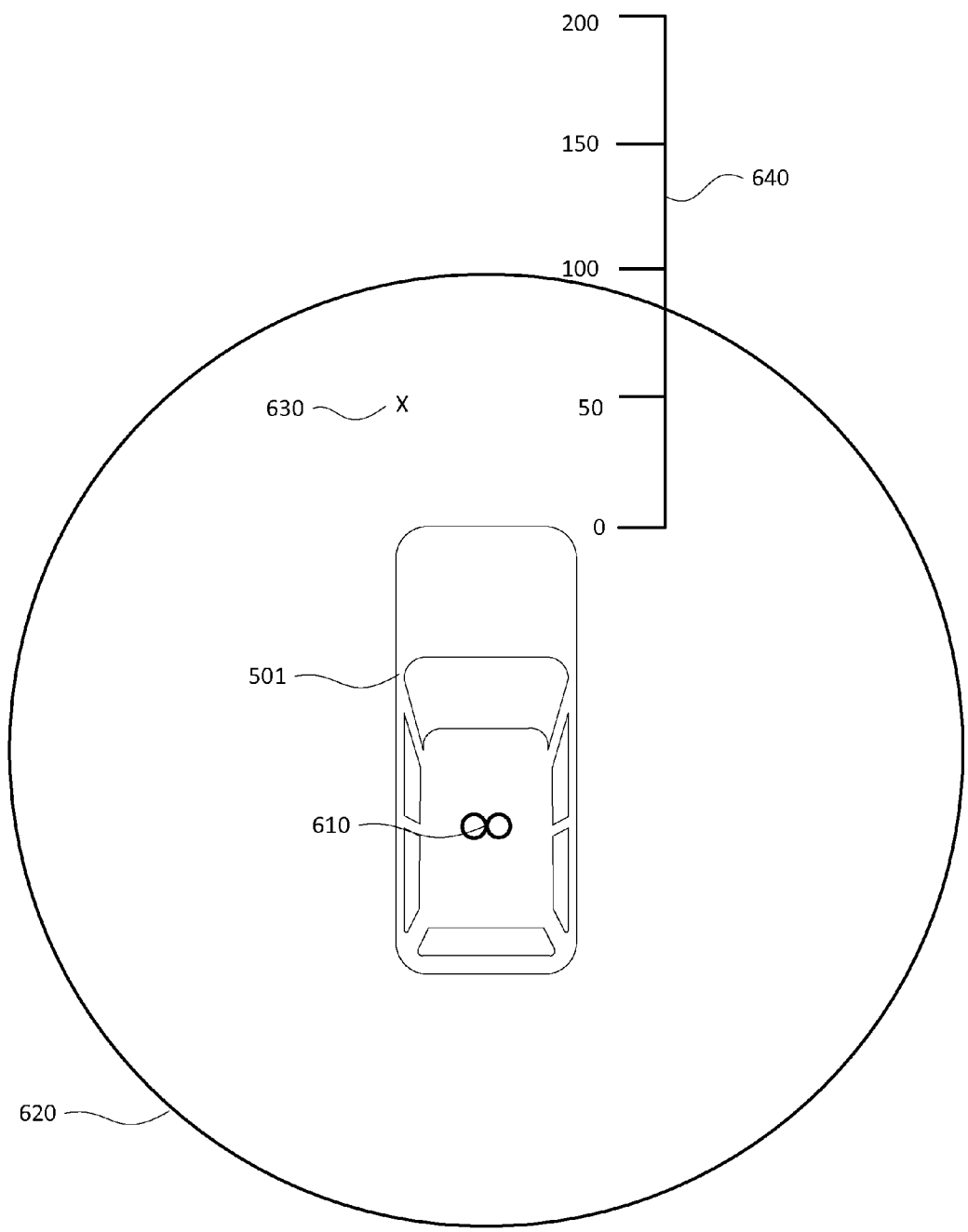
FIG. 6 is an illustration of an object detection system in accordance with aspects of the disclosure.

Data from the sensors may be received and processed by one or more computing devices of the vehicle's perception and/or control systems in real time in order to detect and identify the characteristics of objects in the vehicle's environment, as well as characteristics of the vehicle itself. For example, as shown in FIG. 6 the vehicle 501 may include a one or more sensors, such as sensors 610, or any of the other object detection components 548. The sensors may detect objects within a radius 620 of the vehicle 501. The radius 620 may extend 100 meters or more or less from the vehicle 501, and may be dependent upon the type of object detection components used.

Characteristics of objects in the vehicle's environment may be tracked by the sensors. For example, object 630, represented by an 'X', may be detected by sensors 610. Characteristics of object 630, such as the object's type, orientation, size, and velocity may be determined. Additionally, sensors may also collect information about the vehicle 501, such as the shape of the vehicle, the stiffness of the parts of the vehicle which impact might take place on, orientation of the vehicle, the velocity of the vehicle, etc.

Based on the received characteristics of the object and collected information about the vehicle, the computing devices within the vehicle, such as driving computer system 510, may determine that an impact with an object cannot be avoided by way of braking, steering, and/or accelerating the vehicle. As such, the received characteristics of object and collected information about the vehicle may be used to determine an appropriate amount of shear force necessary to break the one or more shear pins and the amount of time required to break the shears, in an effort to minimize the impact force felt by the object.

This in turn, may be used to determine the appropriate amount of shear force for the shear pins. For example, if the object is a child, the amount of shear force necessary to break the shear pins may be lower than if the object were an adult, as an adult has a greater mass than the child. Additionally, the received characteristics of object and collected information about the vehicle may be used to determine an optimum distance which the shear force will act through to determine whether shear pins should be used inline. In this regard, by spreading the distance which the shear force acts, such as by using multiple shear pins in an inline orientation, the magnitude of the force felt by the object may be reduced.

A shear pin control system, such as pin control system 588, may be used to adjust the amount of shear force necessary to break the one or more shear pins to the determined appropriate amount of shear force, so to minimize the force of impact to the objects outside of the vehicle. For example, the shear pin control system may be activated or deployed by a signal generated by one or more computing devices of the vehicle when an impact with an object is imminent. The shear pin control system 588 may, in response to the signal, cause a solenoid to adjust the amount of shear force necessary to break the one or more shear pins to assist in reducing the impact force felt by the object by tuning the energy absorption of the vehicle components. In this regard, the solenoid may adjust the one or more shear pins, so that the one or more shear pins will break at the determined appropriate shear force.

Other Embodiments

Other types of shear pins and shear pin failure systems may be used alone or in conjunction with the aforementioned embodiments. For example, as shown in FIGS. 7A-7C, the one or more shear pins may be telescoping shear pins. The telescoping shear pins may be comprised of multiple shear stages. FIGS. 7A-7C show cross sectional views of the shear stages, 730-750. The center shear stage, 730 may be comprised of a solid singular piece, whereas the outer stages 740 and 750 may be hollowed to allow other stages to move within them. In this regard shear stages may be held in place by friction, and/or clasps. The telescoping shear pins attached to a panel 720 of a vehicle and inserted through a pinhole formed by plates 710.

To adjust the shear force necessary to break the telescoping shear pins, the number of shear stages inserted into the pinhole may be adjusted. For example, a first orientation of the telescoping shear pins, as shown in FIG. 7A, shows all three shear stages inserted into the pinhole formed by plates 710. Thus, the amount of shear force to break telescoping shear pin would be at its highest.

To reduce the amount of shear force necessary to break the telescoping shear pin, one or more of the stages may be removed from the pinhole, as shown by orientations in FIGS. 7B and 7C. In the orientation shown in FIG. 7B, the center shear stage 730 may be removed from the pinhole. As such, only shear stages 740 and 750 need to be broken for the telescoping shear pin to break. In the orientation shown in FIG. 7C, the center shear stage 730 and the middle shear stage 740 are both removed from the pinhole. As such, only shear stage 750 needs to be broken for the telescoping shear pin to break.

In some embodiments, an actuator, such as solenoid 410 may be used to adjust shear force necessary to break the telescoping shear pin. In this regard, the solenoid 410, using an adjustment arm, such as adjustment arm 415, may adjust the placement and/or orientation of the one or more shear pins in the pinholes. In this regard, the adjustment arm 415 may be connected to one or more of the shear stages, such as center shear stage 730. In response to a signal, the solenoid may pull or push the center shear stage 730 via the adjustment arm 415. By doing so, the solenoid 410 may push in or pull out the center shear stage 730 and/or other shear stages of the telescoping shear pin from a pinhole. In further embodiments, the different shear stages may also be made of the same or different materials, as described further below.

Figure 8:
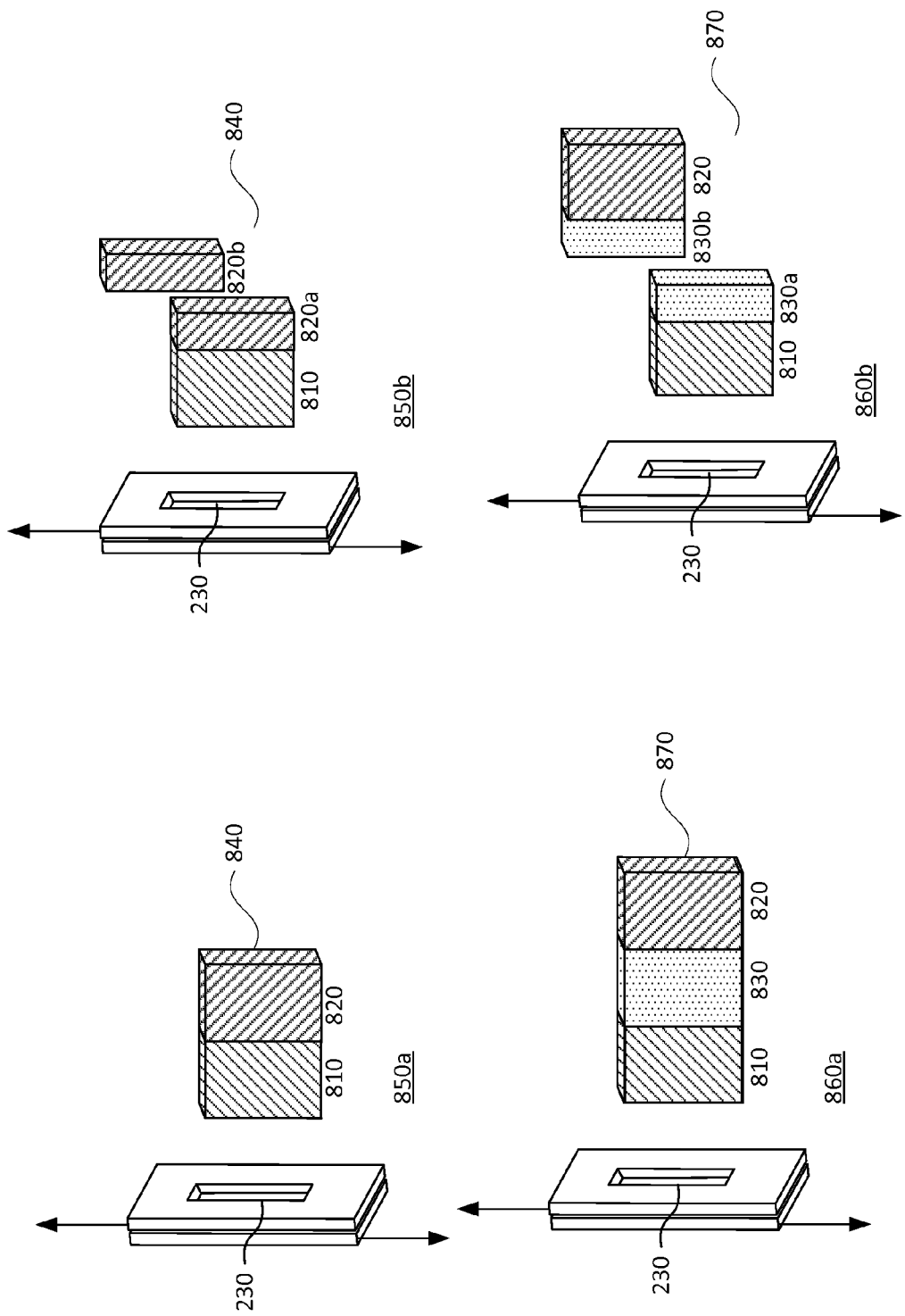
FIG. 8 is an example of a varying material shear pins in accordance with aspects of the disclosure.
Figure 9:
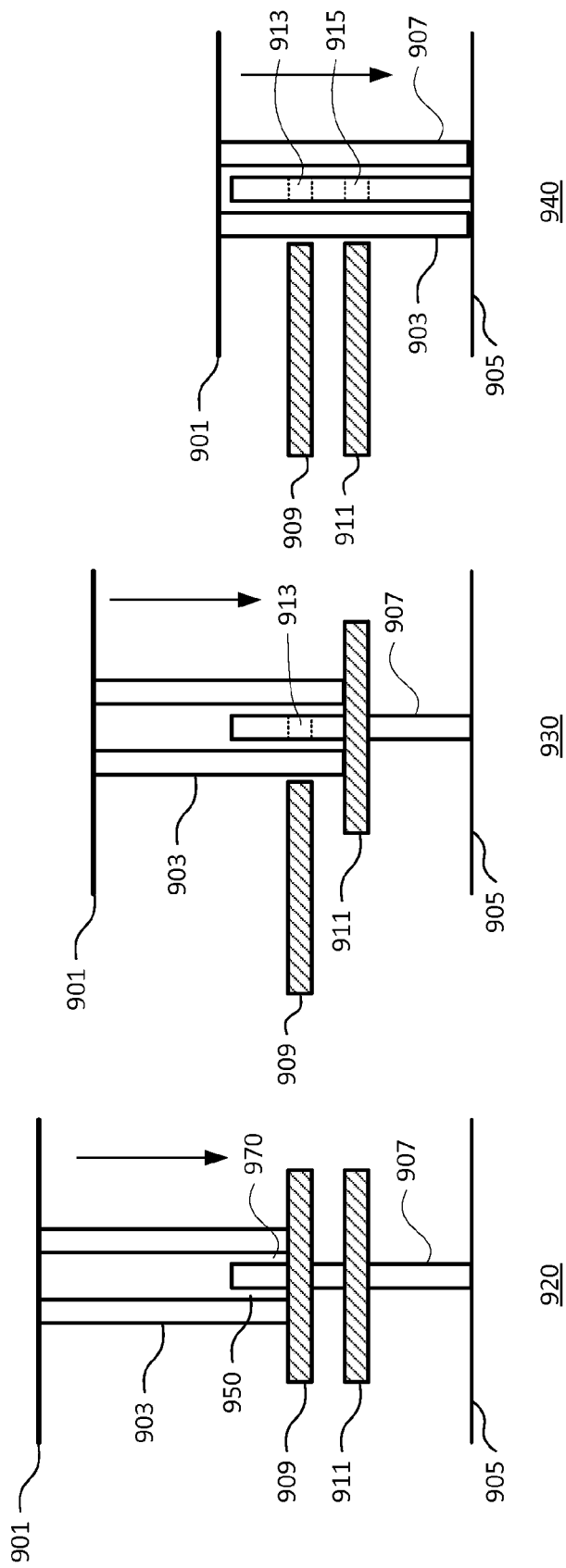
FIG. 9 is an example of a panel attached to a vehicle with a vertical shear in accordance with aspects of the disclosure.

In some embodiments shear pins may be made of more than one material, each of which requires a different shear force to break. As shown in FIG. 8, illustration 850a, a varying material shear pin 840 may be comprised of two materials 810 and 820. The shear pin 840 may be inserted into pinhole 230 which includes a single shear area. The shear pin 840 may be inserted so that material 820 is within the shear area. Accordingly, when a sufficient shear force is applied to the shear area, the shear pin will break at material 820 forming two sections, 820a and 820b, as shown in illustration 850b. In contrast, were the shear pin inserted so that material 810 was within the shear area, the shear pin would break at material 810 upon the application of a specific amount of shear force and form two pieces of material 810 (not shown).

Similarly, illustration 860a shows a varying material shear pin 870 comprised of three materials 810, 820, and 830. The shear pin 870 may be inserted so that material 830 is within the shear area. Accordingly, when a sufficient shear force is applied to the shear area, the shear pin will break at material 830 forming two sections, 1. 830b and 820, and 2. 810 and 830a, as shown in illustration 860b. In other embodiments, the varying material shear pins can be designed as telescoping shear pins and/or tapering shear pins. Additionally, the varying material shear pins can be formed of any number of materials.

As another example, a vertical shear may also be used, which may remove the need for a hinge to connect a panel to the vehicle. For example, a panel 901, or other component of a vehicle as described in more detail above, may be connected to rails 903. The rails may be held in place by a post 907. The post may be attached to body of the vehicle 905. The post 907 may also include pin holes 913 and 915, for inserting shear pins 909 and 911. While only two shear pins are shown, one shear pin, or three or more shear pins may also be used.

As shown in illustration 920, a constant downward force, as illustrated by the downward arrow, may be applied against the first shear pin 909. Shear areas may be formed by the post 907 and the two rails 903, as shown in areas 950 and 970. As such, at rest, the first shear pin 909 should support a shear force equal to the downward force of the panel 901 and the two rails 903, to avoid breaking before any collisions occur.

Upon the application of a shear force sufficient to break the first shear pin 909, the first shear pin 909 may break away. Accordingly, the panel and two rails 903 may move downward into the second shear pin 911, as illustrated in 930. Should sufficient shear force be applied to shear pin 911, shear pin 911 would break and the panel and two rails would completely collapse, as illustrated in 940.

Figure 10:
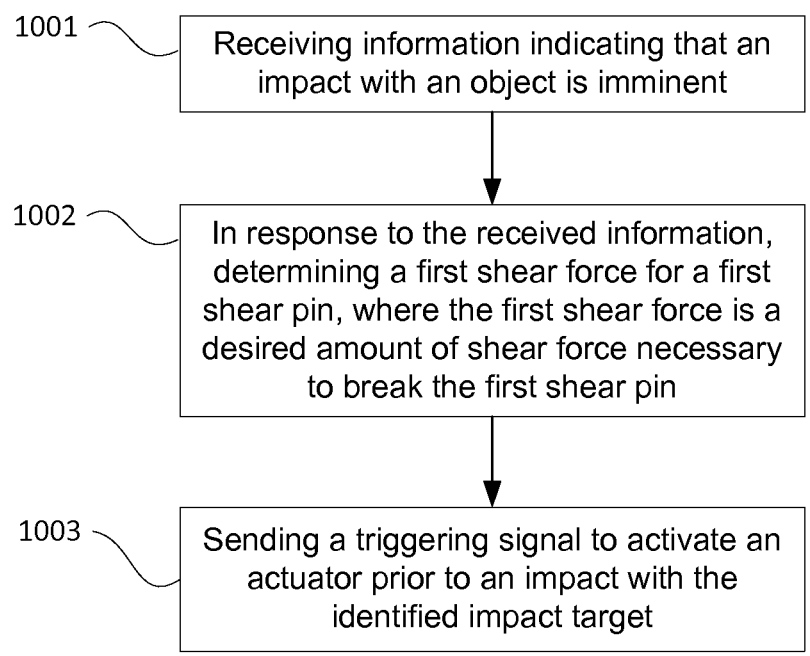
FIG. 10 is a flow diagram in accordance with aspects of the disclosure.

Flow diagram 1000 of FIG. 10 is an example of some of the aspects described above which may be performed by the driving computing system 510. In this example, information may be received indicating that an impact with an object is imminent, as shown at block 1001. In response to the received information, a first shear force for a first shear pin may be determined. The first shear force may be a desired amount of shear force necessary to break the first shear pin as shown at block 1002. A triggering signal may then be sent to activate an actuator to adjust the shear pin prior to impact with the identified target as shown in block 1003.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of adjusting a shear pin to minimize an impact force felt by an object in a collision with a vehicle, the method comprising:
   receiving, from one or more first computing devices having one or more processors by one or more second computing devices having one or more processors, information indicating that an impact with an object is imminent;
   in response to the received information, determining, by the one or more second computing devices, a first shear force for a first shear pin, wherein the first shear force is a desired amount of shear force necessary to break the first shear pin;
   sending, by the one or more second computing devices, a triggering signal to activate an actuator prior to an impact with the object; and
   adjusting, by the actuator, in response to receiving the triggering signal, the first shear pin in a first pinhole, so the first shear pin will break at the first shear force.

2. The method of claim 1, wherein the first shear pin is arranged to prevent a hinge from moving along a slotted path, and further comprising breaking the first shear pin upon impact of the object with the vehicle in order to allow the hinge to move along the slotted path.

3. The method of claim 1, wherein determining the first shear force further includes:
   receiving an estimated mass of the object; and
   identifying the first shear force by selecting between the first shear force and a second shear force for the first shear pin based upon the estimated mass of the object.

4. The method of claim 1, wherein adjusting, by the actuator the first shear pin in a first pinhole further includes:
   adjusting the first shear pin in the first pinhole so the first shear pin is in a double shear area.

5. The method of claim 1, wherein the first shear pin is a telescoping shear pin, and adjusting the first shear pin in the first pinhole further includes:
   adjusting the first shear pin so the first shear pin is moved into the first pinhole.

6. The method of claim 1, further including:
in response to receiving the information, determining, by the one or more second computing devices, a second shear force for a second shear pin, wherein the second shear force is an amount of shear force necessary to break the second shear pin.

7. The method of claim 6, further comprising:
receiving an estimated mass of the object; and
determining that the second shear pin is needed in addition to the first shear pin based upon the estimated mass of the object.

8. A system comprising:
an actuator; and
one or more computing devices having one or more processors, wherein the one or more computing devices are programmed to:
receive information indicating that an impact with an object is imminent;
in response to the received information, determine a first shear force for a first shear pin, wherein the first shear force is a desired amount of shear force necessary to break the first shear pin; and
send a triggering signal to activate an actuator to adjust the first shear pin in a first pinhole, so the first shear pin will break at the first shear force, prior to an impact with the identified object.

9. The system of claim 8, wherein the first shear pin is arranged to prevent a hinge from moving along a slotted path.

10. The system of claim 8, wherein determining the first shear force further includes:
receiving an estimated mass of the object; and
identifying the first shear force by selecting between the first shear force and a second shear force for the first shear pin based upon the estimated mass of the object.

11. The system of claim 8, wherein adjusting, by the actuator the first shear pin in a first pinhole further includes:
adjusting the first shear pin in the first pinhole so the first shear pin is in a double shear area.

12. The system of claim 8, wherein the first shear pin is a telescoping shear pin, and adjusting the first shear pin in the first pinhole further includes:
adjusting the first shear pin so the first shear pin is moved into the first pinhole.

13. The system of claim 8, further including:
in response to receiving the information, determining, by the one or more computing devices, a second shear force for a second shear pin, wherein the second shear force is an amount of shear force necessary to break the second shear pin.

14. The system of claim 13, further comprising:
receiving an estimated mass of the object; and
determining that the second shear pin is needed in addition to the first shear pin based upon the estimated mass of the object.

15. A non-transitory computer-readable storage medium on which computer-readable instructions of a program are stored, the instructions, when executed by a processor, cause the processor to perform a method, the method comprising:
receiving, from one or more first computing devices, information indicating that an impact with an object is imminent;
in response to the received information, determining, a first shear force for a first shear pin, wherein the first shear force is a desired amount of shear force necessary to break the first shear pin; and
sending, a triggering signal to activate an actuator prior to an impact with the identified object, wherein the actuator, in response to receiving the triggering signal, adjusts the first shear pin in a first pinhole, so the first shear pin will break at the first shear force.

16. The non-transitory computer-readable storage medium of claim 15, wherein determining the first shear force further includes:
receiving an estimated mass of the object; and
identifying the first shear force by selecting between the first shear force and a second shear force for the first shear pin based upon the estimated mass of the object.

17. The non-transitory computer-readable storage medium of claim 15, wherein adjusting, by the actuator the first shear pin in a first pinhole further includes:
adjusting the first shear pin in the first pinhole so the first shear pin is in a double shear area.

18. The non-transitory computer-readable storage medium of claim 15, wherein the first shear pin is a telescoping shear pin, and adjusting the first shear pin in the first pinhole further includes:
adjusting the first shear pin so the first shear pin is moved into the first pinhole.

19. The non-transitory computer-readable storage medium of claim 15, further including:
in response to receiving the information, determining, by the one or more second computing devices, a second shear force for a second shear pin, wherein the second shear force is an amount of shear force necessary to break the second shear pin.

20. The non-transitory computer-readable storage medium of claim 19, further comprising:
receiving an estimated mass of the object; and
determining that the second shear pin is needed in addition to the first shear pin based upon the estimated mass of the object.

* * * * *